J. E. Newcomb.
Harvester Dropper.
No. 3485 Reissued Jun. 1, 1869.
Fig. 2
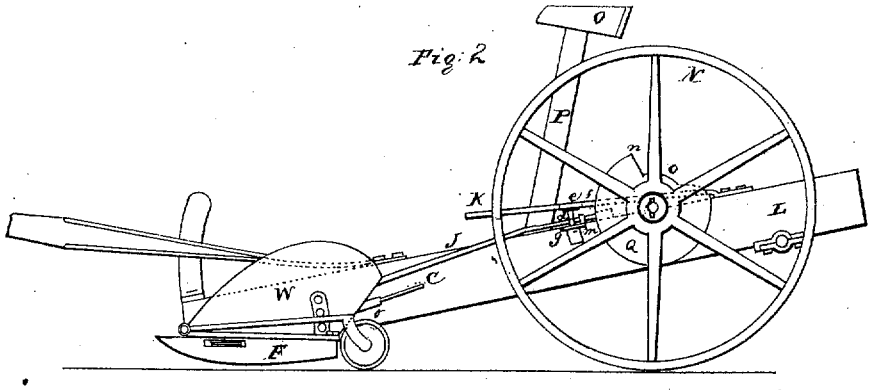
Fig. 3.
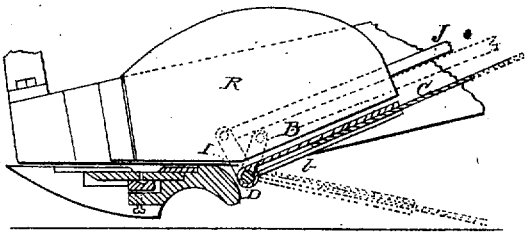
Fig. 1.
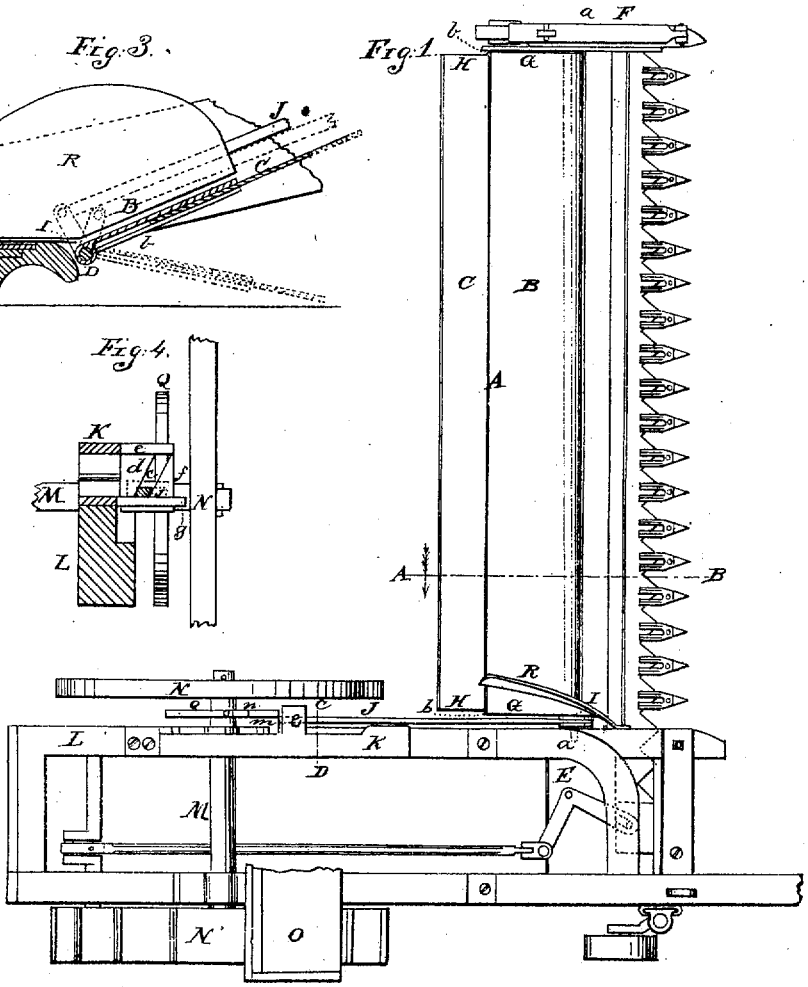
Fig. 4.
Witnesses:
James Langhan
Jno J Wagoner
Inventor:
J. E. Sulerbing

UNITED STATES PATENT OFFICE.

J. F. SEIBERLING, OF AKRON, OHIO, ASSIGNEE OF FANNY HOLMES, EXECUTRIX OF THE ESTATE OF JOHN E. NEWCOMB, DECEASED.

IMPROVEMENT IN HARVESTER-DROPPERS.

Specification forming part of Letters Patent No. 12,215, dated January 9, 1855; Reissue No. 3,485, dated June 1, 1869.

DIVISION No. 2.

*To all whom it may concern:*

Be it known that the late JOHN E. NEWCOMB, of Whitehall, in the county of Washington and State of New York, did invent certain new and useful Improvements in Mowing and Reaping Machines, of which the following is a full, clear, and exact description of that part of the invention or improvements which form the subject-matter of this division of reissue, reference being had to the accompanying drawings, forming a part of this specification, in which—

Figure 1 represents a plan or top view of the machine, the seat and tongue being shown broken off. Fig. 2 represents a side view. Fig. 3 represents a section on line A B, Fig. 1; and Fig. 4 represents a section on line C D, Fig. 1.

To enable those skilled in the art to which the said NEWCOMB'S improvements relate to make and use that part of the said NEWCOMB'S invention or improvements which form the subject-matter of this division of reissue, I will proceed to describe it more in detail.

The nature of these last-named improvements consists, first, in the combination, with the finger-beam of a reaping-machine, of a dropping platform with mechanism for operating the same, whereby the driver from his seat on the machine can release said platform, by the simple action of his foot, so that it may drop down toward the ground at intervals to discharge the cut grain in gavels upon the ground; second, in supporting a dropping platform upon journals or pivots supported by the outer and inner shoes of a reaping-machine, as hereinafter explained; third, in the combination, with a dropping platform the journals of which are supported by the inner and outer shoes, of a crank or arm for operating the same, as hereinafter explained; fourth, in the combination, with the crank or arm by which the dropping platform is operated, of a shield or guard, as hereinafter explained; fifth, in the combination, with the platform-operating crank, arranged as hereinafter described, of an elevating, holding, and depressing rod or bar arranged parallel, or nearly so, to the line of motion of the machine, as and for the purposes hereinafter explained; sixth, in the combination, with the operating-crank, which is combined with the inner journal of a dropping platform, as hereinafter described, of a holding-rod for retaining said platform in an elevated position until a sufficient quantity of cut stalks of grain has been deposited upon the platform to form a gavel; seventh, in the combination, with the rod or arm which holds the rear of the platform in an elevated position, of a stop on the frame of the machine for retaining the operating-rod, for the time being, in a fixed position, as hereinafter explained; eighth, in the combination, in a reaping-machine, of mechanism for automatically elevating the dropping platform, with mechanism for retaining said platform in an elevated position until released by the action of the driver's foot; ninth, in the combination, in a reaping-machine provided with a dropping platform, of a foot device so arranged and combined with the devices or parts which work the platform that they can be thrown into gear at pleasure by the foot of the driver, for purposes hereinafter set forth; tenth, in the combination, in a reaping-machine, with a finger-beam arranged so that it can rise and fall to conform to the inequalities of the ground over which it is drawn, of a dropping platform, with devices or mechanisms for operating the same, whereby the platform can, by means of mechanism thrown into action by the driver's foot, be retained in an elevated position or allowed to drop to discharge the gavel at the pleasure of the driver; eleventh, in certain peculiar devices for operating a dropping platform in reaping-machines, as will be hereinafter explained; twelfth, in the combination, with the finger-beam of a reaping-machine, of an adjustable or extensible platform, as hereinafter explained; thirteenth, in a dropping platform for supporting the cut stalks of grain in a reaping-machine, made in longitudinal sections, one section of which can be moved to reduce the width of the platform, for the purposes hereinafter explained.

In the drawings, A is the platform, which is composed in this instance of two parts, B and C. The front part, B, is secured to and supported by a shaft, D, which is arranged parallel with and back of the finger-beam, and having its journals *a a* supported and fitted to turn freely in bearings supported by the shoes E F of the finger-beam. (See full and dotted lines in Fig. 1.) In this instance the ends G G of the part B are turned under to form flanges or ways *b b* for receiving and supporting the ends H H of the part C, which can be moved in or out under the part B, to widen or narrow the platform A to adapt it for supporting stalks of grain of different lengths, it being necessary in that class of machines which discharge the stalks of cut grain in gavels upon the ground from the rear side of the platform, by a drop or inclining motion of the rear thereof, as indicated in red lines, Fig. 3, that the platform should be just wide enough to support the cut stalks in such a manner that the stubble will penetrate between the heads of the stalks as soon, at least, as the rear of the platform drops or inclines down to its lowest extent. If the platform is too wide the heads of the grain will not extend over the rear side thereof sufficiently to be caught by the stubble when the platform drops or inclines back, and consequently the gavel will be imperfectly discharged, a part of the stalks remaining on the rear side of the platform until the latter is raised, when they are thrown or drawn off in an irregular manner, while if the platform is too narrow the heads of the stalks, especially the heaviest ones, will hang over and be drawn off in a straggling manner before a sufficient amount collects or accumulates upon the platform to form a gavel. It is therefore absolutely necessary and essential that the platform should be so constructed in this class of reaping-machines that it can be adjusted to give proper support to the stalks, whether long or short, and at the same time admit of the stubble penetrating between that portion of the stalks of cut grain which projects over the rear edge of the platform as soon as the platform falls. The said NEWCOMB devised and has shown one good way of accomplishing this important result—viz., by making the platform extensible in the manner above described. If the stalks of the grain are long the part C may be drawn out, as shown in blue lines, Fig. 3, or vice versa, and retained in place in its adjusted position by the ordinary devices of guides or ways and set-screws.

For the purpose of elevating and depressing the rear of the platform to discharge the grain at intervals to form gavels suitable for binding, an arm or crank, I, in this instance is fastened to the inner end of the shaft or platform-support D, and to the outer or upper end of this arm is hinged one end of a rod or bar, J, arranged parallel, or nearly so, with the line of motion of the machine. The rear end of rod J passes through an inclined slot, *c*, in the projection *d* on the under side of the horizontal projection *e* on the foot spring-piece K, the rear end of the latter being fastened to the top of one of the side pieces of the main frame L, which is supported by the axle M, upon the end of which are the supporting-wheels N N′, the latter being fastened to the shaft or axle M in this instance, and is the driving-wheel. The forward end of the foot spring-piece is arranged so that it can be conveniently operated by the driver's foot as he sits on the seat O, which is sustained at a proper height above the main frame by means of standards P, fastened to the side pieces of said frame. The end of rod or bar J works under a guide or loop, *f*, which is so made as to admit of a lateral as well as a longitudinal motion of said rod. The form of the guide or loop *f* is indicated by full and dotted lines, Fig. 4. Projection *d* works through an opening or slot cut or formed in the stand *g*, fastened to the side of the main frame. Loop *f* may be supported on the stand *g*. Upon the main axle M is secured a cam, Q. The face of the cam revolves just back of the outer part of the oblique slot *c* in the downward projection *d*. (See Fig. 4.) A stop or check piece, *m*, is fastened to the side of the main frame, the front of the stop being flush with the face of the cam when the latter is in the position shown in Fig. 2.

The operation of raising and dropping the platform B to support the cut grain and discharge the same at intervals in gavels in suitable form for binding is as follows: Assuming the parts to be in the relative positions shown in Fig. 2, with a sufficient quantity of cut grain upon the platform to form a gavel, the driver presses down the spring-piece K with his foot, thereby forcing down the projection *d*, which moves the end of rod J from the face of stop-piece *m* to the face of cam Q, and as soon as the point *n* of the cam has passed the end of the rod the latter slides back into the depression *o* and the platform falls by its own weight, being accelerated by the weight of the accumulated grain thereon, and the grain is discharged upon the ground in suitable form for binding. As soon as the gavel has been deposited the driver removes his foot from spring-piece K, and rod J, being forced forward by cam Q, crank or arm I, and platform B are moved back into the positions shown in dark lines, Fig. 3, and the action of the slotted piece *d* upon the end of rod J, as the former is raised by the foot spring-piece K, forces it back in front of check-piece *m*, where it is retained until engaged again by the driver, as before explained.

It will thus be seen that the hinged or dropping platform is placed completely under the control of the driver, who can cause the platform to drop at pleasure. This is very important, since in some fields of grain, and in different parts of the same field, it requires a greater surface to be cut than in other places, to secure a sufficient quantity of grain to form the desired size of gavel, and if the platform dropped to discharge the gavel at regular intervals the gavels would be irregular and not of uniform size.

To prevent the stalks of cut grain from falling on or winding in about the platform operating crank or arm I and clogging the same, a guard or shield, R, is arranged to protect said arm, as indicated in the drawings. The shield R is in this instance fastened at its front end to the side of the frame forward of the arm I, and extends out and back, so as to fully protect the front of the arm I by guiding the stalks in upon the platform, thus insuring a free and open space between the inner end of the hinged platform and the side of the inner shoe and main frame for the proper play of the crank or arm I and rod J.

From the foregoing description it will be seen that the said NEWCOMB'S improvements are calculated to overcome and obviate the objections which existed to the use of droppers as constructed prior to his invention.

If the driver had to hold the entire weight of the platform and the grain thereon without the aid of a stop or check piece on the frame of the machine, it would be laborious work, whereas by the use of a stop or check piece he is greatly relieved, so much so that a mere boy capable of driving the team can operate the dropping attachment without undue fatigue or labor, thus rendering the machine still more valuable in an economic point of view.

A divider-board, W, is attached to the outer shoe, F, to aid in separating the cut from the uncut grain.

As the other parts of the NEWCOMB reaping-machine and mower are fully described in another division of reissue, of even date herewith, no further description is here deemed necessary.

Having described that part of said NEWCOMB'S invention or improvements which forms the subject-matter of this division of reissue, what is claimed as the invention of the said JOHN E. NEWCOMB, and desired to have secured by Letters Patent in this division of reissue, is—

1. The combination, with the finger-beam of a reaping-machine, of a dropping platform, with mechanism for operating the same, whereby the driver from his seat on the machine can by the simple action of the foot release said platform so that it may drop toward the ground at regular or irregular intervals to discharge the cut stalks of grain in gavels upon the ground.

2. The combination, with the inner and outer shoes of a reaping-machine, of pivots *a a*, substantially as and for the purposes described.

3. The combination, with a dropping platform the pivots or journals of which are supported by the inner and outer shoes, substantially as described, and in rear of the finger-beam, of an operating-crank or projecting arm attached to the inner pivot or journal, for the purposes stated.

4. The combination, with the crank or projecting arm I, arranged as described, for operating the platform, of a shield or guard, R, or equivalent device, for shielding said arm from cut stalks of grain, substantially as stated.

5. The combination, with the operating-crank I, arranged substantially as described, of an elevating, holding, and depressing rod or bar arranged parallel, or nearly so, with the line of motion of the machine, for the purposes stated.

6. The combination, with the crank or projecting arm, combined with the journal which supports the inner end of a dropping platform in a reaping-machine, of a holding rod or bar for retaining said platform in an elevated position until a sufficient quantity of cut stalks of grain has accumulated to form a gavel.

7. The combination, with the rod or arm which holds the rear of the platform in an elevated position while the cut stalks of grain are accumulating to form a gavel, of a stop or check piece on the frame of the machine for retaining the operating-rod, for the time being, in a fixed position and relieving the driver, substantially as stated.

8. The combination, in a reaping-machine, of mechanism for automatically elevating the dropping platform, with a retaining stop or device for holding said platform in an elevated position until released by the action of the driver's foot.

9. The combination, in a reaping-machine provided with a grain-dropping platform, of a foot device so arranged and combined with the devices and mechanism by which the platform is operated that they can be thrown into gear at pleasure by the foot of the driver, for the purposes stated.

10. The combination, in a reaping-machine, with a finger-beam arranged so that it can rise and fall to conform to the inequalities of the ground over which it is drawn, of a dropping platform, and devices or mechanism for operating the same in such a manner that the platform can, by means of mechanism thrown into action or gear by the driver's foot, be retained in an elevated position or allowed to drop to discharge the gavel at the pleasure of the driver.

11. The combination, with the platform arm or crank I, of rod or bar J, cam Q, stop *m*, loop *f*, and foot spring-piece K, with its projections *e* and *d*, substantially as and for the purposes set forth.

12. The combination, with the finger-beam of a reaping-machine, of a grain-platform adjustable or extensible in the direction of its width, substantially as and for the purposes stated.

13. A dropping platform for supporting the cut stalks of grain in a reaping-machine, made in longitudinal sections, one section of which can be moved so as to reduce the platform in width the width of the section so moved, for the purposes stated.

J. F. SEIBERLING.

Witnesses:

W. L. CLARK,

J. H. BELLOWS.